United States Patent
Kang

(10) Patent No.: US 7,986,105 B2
(45) Date of Patent: Jul. 26, 2011

(54) BACKLIGHT DRIVING METHOD AND DISPLAY APPARATUS USING THE SAME

(75) Inventor: Sang-hoon Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 368 days.

(21) Appl. No.: 12/140,835

(22) Filed: Jun. 17, 2008

(65) Prior Publication Data

US 2009/0140664 A1 Jun. 4, 2009

(30) Foreign Application Priority Data

Dec. 4, 2007 (KR) .................. 10-2007-0125074

(51) Int. Cl.
 *H05B 41/36* (2006.01)

(52) U.S. Cl. ............... 315/291; 315/307; 315/308
(58) Field of Classification Search .......... 315/291, 315/312, 294, 299, 300, 301, 307, 308, 311, 315/185 R, 361, DIG. 4, DIG. 5, DIG. 2
See application file for complete search history.

(56) References Cited

U.S. PATENT DOCUMENTS

2006/0255750 A1* 11/2006 Hotta et al. ............... 315/291
* cited by examiner

*Primary Examiner* — Douglas W Owens
*Assistant Examiner* — Jianzi Chen
(74) *Attorney, Agent, or Firm* — Sughrue Mion, PLLC

(57) ABSTRACT

A display and a method for driving a backlight thereof are provided. The display generates a control voltage and supplies the generated control voltage to a backlight driving unit in a step-wise manner. Accordingly, malfunctions of the backlight due to incomplete activation during initial driving, can be avoided.

22 Claims, 2 Drawing Sheets

BACKLIGHT DRIVING METHOD AND DISPLAY APPARATUS USING THE SAME

CROSS-REFERENCE TO RELATED APPLICATIONS

This application claims priority from Korean Patent Application No. 2007-125074, filed on Dec. 4, 2007, the entire content of which is incorporated herein by reference.

BACKGROUND OF THE INVENTION

1. Field of the Invention

Methods and apparatuses consistent with the present invention relate to a backlight driving method and a display apparatus using the same, and more particularly, to backlight driving method for adjusting the brightness of a backlight using a pulse width modulation (PWM) dimming method, and a display apparatus using the same.

2. Description of the Related Art

A liquid crystal display (LCD) display does not generally employ a self-radiating element, and thus requires a backlight to produce light.

One or more cold cathode fluorescent lamps (CCFL) are generally used as the light source of the backlight. The CCFL is operated in the range of normal glow discharge. The CCFL includes a sealed glass tube having an inner coating of phosphor. The sealed glass tube holds inert gases and a slight amount of mercury.

By adding high frequency waves between electrodes at both ends of the glass tube, glow discharge occurs in the low pressure mercury vapor. Mercury atoms, which are excited by the discharge, emit ultraviolet rays, and these ultraviolet rays excite the phosphor. A light is then radiated, with the wavelength corresponding to an energy difference, when the excited phosphor atoms return to the energy level of the ground state. Accordingly, the CCFL produce light in color representation according to the characteristics of the phosphor.

The CCFL is generally as thin as a wire and operates with low electric currents. The CCFL has many advantages such as low power consumption, low heat, high efficiency, and long life. Accordingly, CCFL has been widely adopted in the devices such as backlight for laptop computers, thin film transistor liquid crystal display (TFT-LCD), copier, and others.

Meanwhile, the CCFL has to have a dimming function, as well as switch on/off functions. The analog dimming, and pulsewidth modulation (PWM) (or, burst dimming), are mainly used to adjust the brightness of the CCFL.

The analog dimming adjusts the brightness, by adjusting the amplitude of a driving signal applied to the CCFL. The PWM dimming adjusts the brightness, by adjusting the pulsewidth of a PWM signal. The analog dimming is more convenient to use, but has a limited range of brightness adjustment. The PWM dimming provides a wider range of brightness adjustment, but may cause the overall operation of the inverter to be instable, due to repeated switching on and off The LCD display drives CCFL according to a lamp current according the specifications. However, if the worst case applies to the initial driving of the lamp, for example, if cool start, or dynamic contrast ratio (DCR), applies, the CCFL is driven with an electric current lower than is prescribed by the specifications.

If this worst-case scenario happens, the mercury of the CCFL is not activated enough, resulting in malfunctions such as abnormality occurring in the color coordinates or flickering.

Accordingly, a method is required, to prevent a possible malfunction of a backlight, due to unsuccessful activation during an initial driving stage.

SUMMARY OF THE INVENTION

The present invention provides a display apparatus and a method for driving a backlight thereof, by generating a control voltage in a step-wise manner and applying the generated control voltage to a backlight driving unit, thereby preventing a malfunction from occurring due to inactivation of the backlight during an initial backlight driving.

The present invention also provides a display apparatus for controlling a backlight driving unit so that a level of brightness of the backlight is adjusted in a step-wise manner.

The present invention also provides a display apparatus capable of changing a manner of initial backlight driving, according to the state of the display apparatus.

According to an aspect of the present invention, there is provided a display including a backlight including a plurality of cathode fluorescent lamps, a backlight driving unit which drives the backlight based on an input control voltage, and a control unit which generates a control voltage and applies the generated control voltage to the backlight driving unit in a step-wise manner.

The control unit generates the control voltage in step-wise manner if a size of a set voltage is larger than that of a reference voltage, and directly generates the control voltage to the size of the set voltage, if the size of the set voltage is smaller than that of the reference voltage.

The control unit compares the size of the set voltage with that of the reference voltage, if the backlight is changed from OFF state to ON state, or to a dynamic contrast ratio (DCR) mode.

The control unit generates the control voltage in step-wise manner, by undertaking a first stage to increase the control voltage to the reference voltage, a second stage to maintain the control voltage at the reference voltage, and a third stage to increase the driving voltage to the set voltage, if the size of the set voltage is larger than that of the reference voltage, and directly generates the control voltage to the size of the set voltage, if the size of the set voltage is smaller than that of the reference voltage.

The reference voltage is implemented as a voltage required to activate the backlight.

The set voltage is implemented as the control voltage required to display an image according to setting by a user.

The control unit generates the control voltage to supply to the backlight driving unit in step-wise manner, by undertaking a stage to maintain the control voltage at a reference voltage.

The control unit maintains the control voltage at the reference voltage for a duration of time required to activate the backlight.

The control unit generates the control voltage to be supplied to the backlight driving unit in step-wise manner, by undertaking a first stage to increase the control voltage to a reference voltage, a second stage to maintain the control voltage at the reference voltage, and a third stage to increase the control voltage to a set voltage which is required to display an image according to setting by a user.

The control voltage is implemented as a pulse width modulation (PWM) dimming voltage.

According to an aspect of the present invention, there is provided a method for driving a backlight comprising a backlight including a plurality of cathode fluorescent lamps, and a backlight driving unit which drives the backlight based on a received control voltage, the method including generating a control voltage to be supplied to the backlight driving unit in a step-wise manner, and applying the control voltage to the backlight driving unit.

The generating includes generating the control voltage in step-wise manner if a size of a set voltage is larger than that of a reference voltage, and directly generating the control voltage to the size of the set voltage, if the size of the set voltage is smaller than that of the reference voltage.

The method may further include comparing the size of the set voltage with that of the reference voltage, if the backlight is changed from OFF state to ON state, or to a dynamic contrast ratio (DCR) mode.

The generating may include generating the control voltage in step-wise manner, by undertaking a first stage to increase the control voltage to the reference voltage, a second stage to maintain the control voltage at the reference voltage, and a third stage to increase the driving voltage to the set voltage, if the size of the set voltage is larger than that of the reference voltage, and directly generating the control voltage to the size of the set voltage, if the size of the set voltage is smaller than that of the reference voltage.

The reference voltage is implemented as a voltage required to activate the backlight.

The set voltage is implemented as the control voltage required to display an image according to setting by a user.

The generating may include generating the control voltage to supply to the backlight driving unit in step-wise manner, by undertaking a stage to maintain the control voltage at a reference voltage.

The maintaining may include maintaining the control voltage at the reference voltage for a duration of time required to activate the backlight.

The generating may include generating the control voltage to be supplied to the backlight driving unit in step-wise manner, by undertaking a first stage to increase the control voltage to a reference voltage, a second stage to maintain the control voltage at the reference voltage, and a third stage to increase the control voltage to a set voltage which is required to display an image according to setting by a user.

The control voltage is implemented as a pulse width modulation (PWM) dimming voltage.

According to an aspect of the present invention, there is provided a display, including a backlight, a backlight driving unit which drives the backlight, and a control unit which controls the backlight driving unit so that a level of brightness of the backlight is changed in step-wise manner.

The control unit controls the backlight driving unit to cause the level of brightness of the backlight is changed in step-wise manner, if a brightness level set by a user is lower than a brightness level of the backlight.

According to an aspect of the present invention, there is provided a display to display an image, including a backlight, a backlight driving unit which drives the backlight, and a control unit which controls the backlight driving unit to cause the backlight to be initially driven according to a first initial driving manner, if the display is determined to be in a first state, and to cause the backlight to be initially driven according to a second initial driving manner, if the display is determined to be in a second state.

A brightness level set by a user is lower than a reference brightness in the first state, and the backlight driving unit is controlled to cause the backlight to change brightness level in step-wise manner in the first initial driving manner, and the brightness level set by the user is higher than the reference brightness in the second state, and the backlight driving unit is controlled to cause the backlight to directly change the brightness level.

BRIEF DESCRIPTION OF THE DRAWINGS

The above and other aspects of the present invention will be more apparent from the following detailed description of exemplary embodiments of the present invention with reference to the accompanying drawings, in which.

DETAILED DESCRIPTION OF THE EXEMPLARY EMBODIMENTS

Hereinafter, exemplary embodiments of the present invention will be described in detail with reference to the accompanying drawings.

Figure 1:
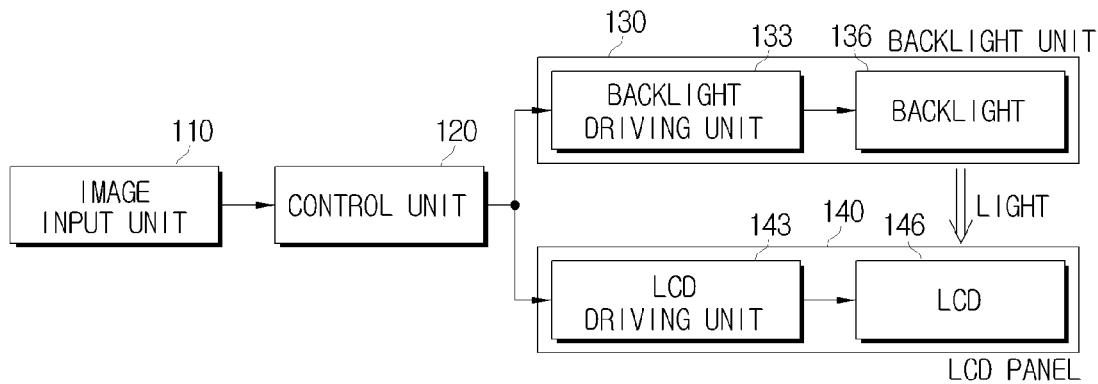
FIG. 1 is a block diagram of a liquid crystal display (LCD) according to an exemplary embodiment of the present invention.

FIG. 1 is a block diagram of a liquid crystal display (LCD) according to an exemplary embodiment of the present invention.

Referring to FIG. 1, the LCD includes a image input unit 110, a control unit 120, a backlight unit 130 and a LCD panel 140. The backlight unit 130 includes a backlight driving unit 133 and a backlight 136. The LCD panel 140 includes a LCD driving unit 143, and a LCD 146.

The image input unit 110 receives an external image. The image input unit 110 includes an interface to connect to an external device.

The control unit 120 generates an image signal by converting the received image into a form appropriate for the LCD panel 140, and generates a brightness control signal for the backlight unit 130.

The image signal is transmitted to the LCD panel 140, and the brightness control signal is transmitted to the backlight unit 130. The image signal includes information about the image, such as brightness and color. The brightness control signal is in proportion to the brightness of the image, and is used to control the brightness of the backlight.

The brightness control signal is generated in a form of a control voltage. If the pulsewidth modulation (PWM) dimming is applied, a PWM dimming voltage is used as a control voltage.

The PWM dimming voltage, that is, the control voltage is generated at the control unit 120 and sent to the backlight driving unit 133. A driving voltage is generated, as the PWM dimming voltage is processed by an inverter (not illustrated) of the backlight driving unit 133. In this process, the inverter (not illustrated) inverts the PWM dimming voltage. Since the driving current has a lower duty ratio as the PWM dimming voltage increases, the backlight is less bright if the PWM dimming voltage increases.

The functions of the control unit 120 will be explained in detail below.

The backlight unit 130 includes the backlight driving unit 133 and the backlight 136. The brightness of the backlight 136 of the display is adjusted generally by analog dimming or PWM dimming.

The analog dimming adjusts the amplitude of the driving current. Generally, the amplitude of the driving current is fixed, so the PWM dimming is generally used to adjust the brightness of the display.

The PWM dimming adjusts the brightness, by changing a duty ratio of the driving current. The duty ratio (or duty cycle) is a percentage measure of a proportion of a wave packet of a driving current with respect to a predetermined period. For example, if a duty ratio is 50%, the driving current is applied for a half of a predetermined period, and not applied for the remaining half of the period. As a result, the backlight 136 is switched on and off once, during the predetermined period.

Meanwhile, the time in which the driving current is applied is very short to express a dark image. In this case, the backlight may not be activated sufficiently, resulting in problems such as errors in the color coordinates or flickering.

Accordingly, the control unit 120 generates a PWM dimming voltage in a step-wise manner and supplies the generated voltage to the backlight driving unit 133. In other words, the control unit 120 generates the PWM dimming voltage through a plurality of stepped voltage levels. As the PWM dimming voltage is applied to the backlight driving unit 133 in a step-wise manner, the driving current is supplied to the backlight 136 for a minimum time and has the backlight 136 activated.

The backlight driving unit 133 receives a PWM dimming voltage as a control voltage from the control unit 120, and sends a corresponding driving current to the backlight 136.

The backlight 136 generates light based on the driving current received from the backlight driving unit 133, and emits the light onto the LCD panel 140. A plurality of cathode fluorescent lamps is generally used as the lamps for the backlight 136. The cathode fluorescent lamps may be implemented by the cold cathode fluorescent lamps (CCFL), hot cathode fluorescent lamp (HCFL), or flat fluorescent lamps (FFL). The backlight 136 explained below includes the CCFL according to an exemplary embodiment of the present invention.

However, one should understand that the backlight 136 having the CCFL is only explained as an example. Therefore, the concept of the present invention is applicable to various alternative examples.

The LCD panel 140 visualizes the received image signal by adjusting the transmissivity of the light generated at the backlight 136. The LCD panel 140 includes the LCD driving unit 143 and the LCD 146.

The LCD driving unit 143 receives an image signal from the control unit 120, and by using the information included in the received image signal, such as brightness or color information, generates a driving signal to drive the LCD 146 and sends the generated driving signal to the LCD 146.

The LCD 146 may include two facing boards on which electrodes are formed, and liquid crystal material injected between the two boards. If electric voltage is applied to the two electrodes, electric field is generated, thereby moving the liquid crystal atoms injected between the boards and adjusting the transmissivity of the light. As a result, the light transmissivity of the LCD 146 is adjusted based on the image signal.

As explained above, the backlight unit 130 adjusts the brightness of the backlight 136 based on the PWM dimming voltage applied from the control unit 120.

The operations of the control unit 120 will be explained in detail below, with reference to FIGS. 2 to 4.

Figure 2:
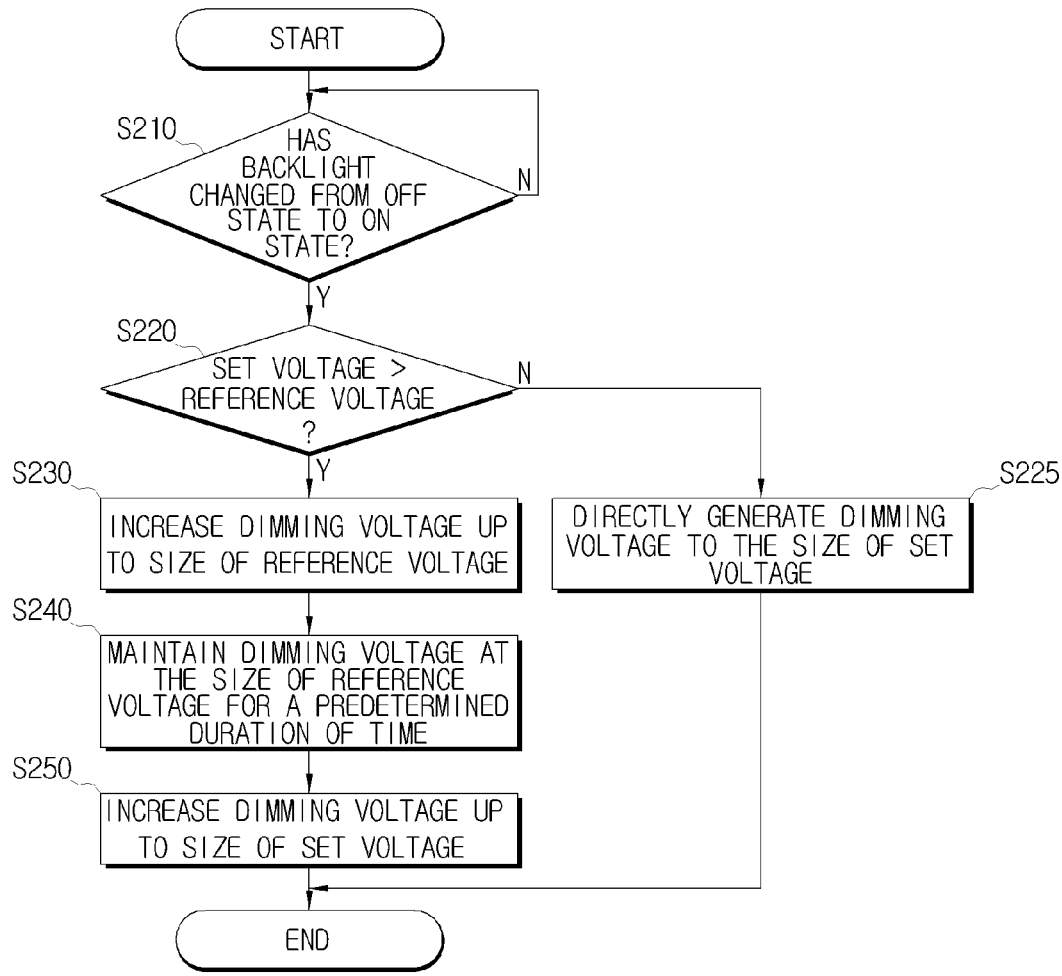
FIG. 2 is a flowchart illustrating a method for driving a backlight according to an exemplary embodiment of the present invention.

FIG. 2 is a flowchart illustrating a method for driving a backlight according to an exemplary embodiment of the present invention.

At operation S210, the control unit 120 determines if the backlight 136 is changed from OFF state to ON state. If the backlight 136 is changed from OFF state to ON state, it indicates that the backlight 136 is in initial driving stage, and therefore, there is a possibility that the CCFL of the backlight 136 has not been activated completely.

Accordingly, at operation S210-Y, if determining that the backlight 136 is changed from OFF state to ON state, at operation S220, the control unit 120 compares the size of a set voltage with a reference voltage. The backlight 136 is changed from OFF state to ON state by a software (S/W) power-on in which the backlight 136 is turned on by pressing on a power button provided on the display, a hardware (H/W) power-on in which a power cord of the display is plugged in, and dynamic contrast ratio (DCR) mode. Additionally, any other examples can apply if they cause the backlight 136 to change from OFF state to ON state.

The set voltage refers to a PWM dimming voltage which is required to display an image according to setting by a user. The set voltage may be stored in an electrically erasable and programmable read only memory (EEPROM) of the display, along with the user set values.

For example, if a user sets the brightness to 95 using the menu provided by the display, the set voltage will be a PWM dimming voltage which is required to display an image at the brightness of 95. The latest user set value is applied as a set voltage. However, if a user has set environment of the initial image in advance, the set voltage can be determined according to such user setting values of the environment.

The reference voltage is a PWM dimming voltage required to activate the backlight 136. As explained above, the driving current applied to the backlight 136 has a higher duty ratio, as a lower PWM dimming voltage is generated at the control unit 120. Accordingly, the backlight 136 can be activated sufficiently, as the PWM dimming voltage below the reference voltage is applied to the backlight driving unit 133.

At operation S220-N, if the set voltage is lower than the reference voltage, at operation S225, the control unit 120 generates a dimming voltage with the set voltage size, instead of generating the dimming voltage in a step-wise manner. In other words, the control unit 120 generates the dimming voltage without intermediate stepped voltage levels. By doing so, the backlight 136 receives a sufficient driving current to be activated.

If the set voltage is lower than the reference voltage, it indicates that the user has set higher brightness level than the reference brightness corresponding to the reference voltage. As explained above, the higher PWM dimming voltage means the lower brightness of the backlight 136.

Figure 3:
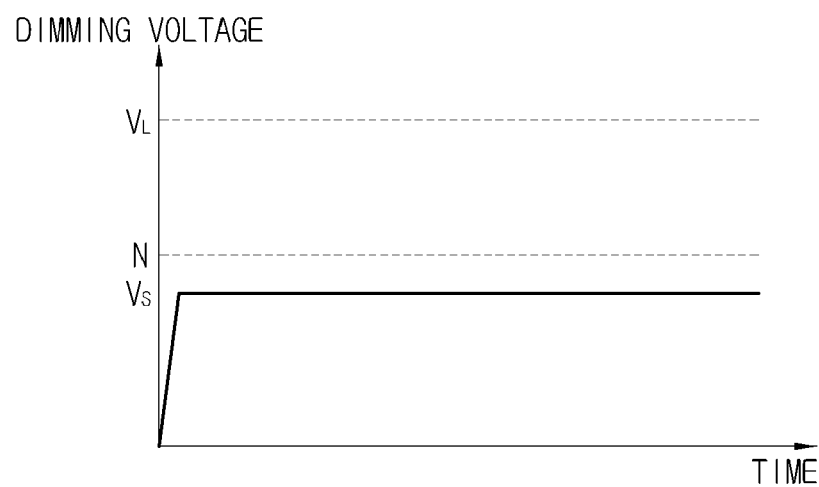
FIG. 3 is a graphical representation of a dimming voltage appearing when a set voltage is lower than a reference voltage, according to an exemplary embodiment of the present invention.

FIG. 3 more intrinsically shows that the control unit 120 generates a dimming voltage directly to the size of a set voltage, instead of generating a dimming voltage in a step-wise manner.

Specifically, FIG. 3 is a graphical representation of a PWM dimming voltage appearing when the set voltage is lower than the reference voltage according to an exemplary embodiment of the present invention. Referring to FIG. 3, a PWM dimming voltage ($V_L$) appears when the backlight 136 is in the dimmest state. The reference symbol 'N' refers to a reference voltage, and 'Vs' is a set voltage.

As shown in FIG. 3, the PWM dimming voltage increases directly up to the set voltage, if the set voltage Vs is lower than the reference voltage N.

At operation S220-Y, if the set voltage is higher than the reference voltage, the backlight 136 may not receive a minimum level of driving current required to activate. In this case, the control unit 120 generates a PWM dimming voltage to be supplied to the backlight driving unit 133 in a step-wise manner.

The operation of generating a PWM dimming voltage in a step-wise manner will be explained below in greater detail with reference to FIG. 4.

Figure 4:
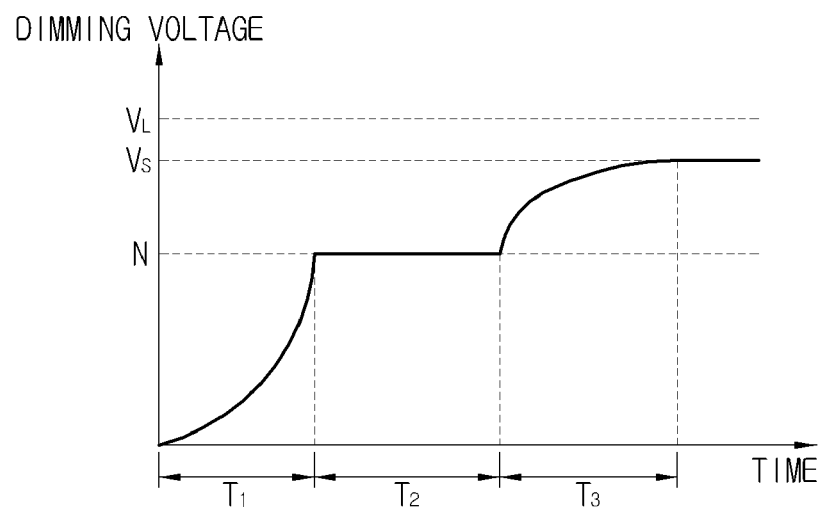
FIG. 4 is a graphical representation of a dimming voltage appearing when a set voltage is greater than a reference voltage, according to an exemplary embodiment of the present invention.

FIG. 4 is a graphical representation of a dimming voltage appearing when the set voltage is higher than the reference voltage.

Referring to FIG. 4, if the set voltage (Vs) is higher than the reference voltage (N), the control unit 120 generates a PWM dimming voltage by three stages.

In the first stage, that is, at operation S230, the control unit 120 increases the PWM dimming voltage up to the reference voltage for the duration of $T_1$. In the second stage, that is, at operation S240, the control unit 120 maintains the PWM dimming voltage at the size of the reference voltage for the duration of $T_2$. In the third stage, that is, at operation S250, the control unit 120 increases the PWM dimming voltage for the duration of $T_3$ and generates the resultant PWM dimming voltage.

As explained above, the control unit 120 generates a PWM dimming voltage by three stages, so that enough driving current and time can be ensured to activate the backlight 136 even when the set voltage is generated higher than the reference voltage. In other words, even when the backlight 136 generates light dimmer than the reference brightness corresponding to the reference voltage, the backlight 136 can receive enough driving current and time to be activated.

The duration of time $T_2$ corresponds to a minimum time required to activate the backlight 136. The time for activating the backlight 136 varies according to the type of the lamps composing the backlight 136. The other durations of time T1 and T3 are set to ensure that the backlight 136 is not overloaded and that the changes in brightness are perceived by a user without eye strain.

As explained above, the control unit 120 generates the PWM dimming voltage in a step-wise manner. In other words, the control unit 120 controls the backlight driving unit 133 to change the brightness level of the backlight 136 in a step-wise manner. Furthermore, if the brightness level set by the user does not exceed the reference that corresponds to the reference voltage, the control unit 120 can control the backlight driving unit 133 so that the brightness level of the backlight 136 changes in a step-wise manner.

As explained above, the control unit 120 is capable of determining an initial manner of driving the backlight 136 appropriately according to the state of the display.

According to the exemplary embodiments of the present invention, even when the backlight 136 is in unfavorable condition for activation, malfunctions such as error in the color coordinates or flickering can be avoided.

While the exemplary embodiments of the present invention explained above exemplified that the PWM dimming voltage is used as a control voltage, one will understand that the concept of the present invention is not limited to this specific example. Accordingly, other forms of voltage, such as analog dimming voltage, may be applied as a control voltage according to various exemplary embodiments of the present invention.

Furthermore, while the LCD is implemented as an example of the display according to the exemplary embodiments of the present invention explained above, one will understand that other forms of display that use backlights can appropriately be implemented according to various exemplary embodiments of the present invention.

As explained above, according to the exemplary embodiments of the present invention, a display and a method for driving backlight are provided, which generate and supply a control voltage in a step-wise manner, so that malfunctions of the backlight due to incomplete activation of the backlight during the initial driving, can be avoided.

Specifically, since the control voltage is maintained at a reference voltage for a predetermined duration of time, enough time is ensured for activating the backlight, and malfunctions of the backlight due to incomplete activation of the backlight during the initial driving, can be avoided.

Furthermore, the backlight is driven more efficiently, since the control voltage is generated in a step-wise manner only when the set voltage is higher than the reference voltage.

The foregoing embodiments and advantages are merely exemplary and are not to be construed as limiting the present invention. The present teachings can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A display comprising:
   a backlight comprising a plurality of cathode fluorescent lamps;
   a backlight driving unit which drives the backlight based on an input control voltage; and
   a control unit which generates a first control voltage in a step-wise manner, and supplies first control voltage to the backlight driving unit,
   wherein the step-wise manner comprises a plurality of stepped voltage levels that vary with time; and
   wherein the control unit generates the first control voltage in step-wise manner if a set voltage is larger than a reference voltage, and generates a second control voltage directly to a level of the set voltage, if the set voltage is smaller than the reference voltage.

2. The display of claim 1, wherein the control unit compares the set voltage with the reference voltage, if the backlight is changed from an OFF state to an ON state, or to a dynamic contrast ratio (DCR) mode.

3. The display of claim 2, wherein the control unit generates the first control voltage in the step-wise manner, by increasing at a first stage, the first control voltage to the reference voltage, maintaining at a second stage, the first control voltage at the reference voltage, and increasing at a third stage, the first voltage to the set voltage, if the set voltage is larger than the reference voltage, and
   generates the second control voltage directly to the level of the set voltage, if the set voltage is smaller than the reference voltage.

4. The display of claim 1, wherein the reference voltage is a voltage required to activate the backlight.

5. The display of claim 1, wherein the set voltage is a control voltage required to display an image according to a setting of a user.

6. The display of claim 1, wherein the control unit generates the first control voltage to supply to the backlight driving unit, in the step-wise manner, by maintaining at a stage, the first control voltage at a reference voltage.

7. The display of claim 6, wherein the control unit maintains the first control voltage at the reference voltage for a duration of time required to activate the backlight.

8. The display of claim 1, wherein the control unit generates the first control voltage to be supplied to the backlight driving unit, in the step-wise manner, by increasing at a first stage, the first control voltage to a reference voltage, maintaining at a second stage, the first control voltage at the reference voltage, and increasing at a third stage, the first control voltage to a set voltage which is required to display an image according to a setting of a user.

9. The display of claim 1, wherein the first control voltage is a pulse width modulation (PWM) dimming voltage.

10. The display of claim 1, wherein the control unit generates the first control voltage in the step-wise manner, by increasing at a first stage, the first control voltage to the reference voltage, maintaining at a second stage, the first control voltage at the reference voltage, and increasing at a third stage, the first voltage to the set voltage, if the set voltage is larger than the reference voltage, and
generates the second control voltage directly to the level of the set voltage, if the set voltage is smaller than the reference voltage.

11. A method for driving a backlight including a backlight including a plurality of cathode fluorescent lamps, and a backlight driving unit which drives the backlight based on a received control voltage, the method comprising:
generating one of a first control voltage and a second control voltage, the first control voltage being generated in a step-wise manner; and
applying one of the first and the second control voltages to the backlight driving unit,
wherein the step-wise manner comprises a plurality of stepped voltage levels that vary with time; and
wherein the generating comprises:
generating the first control voltage in the step-wise manner if a set voltage is larger than a reference voltage, and generating the second control voltage directly to a level of the set voltage, if the set voltage is smaller than the reference voltage.

12. The method of claim 11, further comprising comparing the set voltage with the reference voltage, if the backlight is changed from an OFF state to an ON state, or to a dynamic contrast ratio (DCR) mode.

13. The method of claim 12, wherein the generating comprises:
generating the first control voltage in the step-wise manner, by increasing at a first stage, the first control voltage to the reference voltage, maintaining at a second stage, the first control voltage at the reference voltage, and increasing at a third stage, the first control voltage to the set voltage, if the set voltage is larger than the reference voltage, and generating the second control voltage directly to the level of the set voltage, if the set voltage is smaller than the reference voltage.

14. The method of claim 11, wherein the reference voltage is a voltage required to activate the backlight.

15. The method of claim 11, wherein the set voltage is a control voltage required to display an image according to a setting of a user.

16. The method of claim 11, wherein the generating comprises generating the first control voltage to supply to the backlight driving unit, in the step-wise manner, by maintaining at a stage, the first control voltage at a reference voltage.

17. The method of claim 16, wherein the maintaining comprises maintaining the first control voltage at the reference voltage for a duration of time required to activate the backlight.

18. The method of claim 11, wherein the generating comprises generating the first control voltage to be supplied to the backlight driving unit, in step-wise manner, by increasing at a first stage, the first control voltage to a reference voltage, maintaining at a second stage, the first control voltage at the reference voltage, and increasing at a third stage, the first control voltage to a set voltage which is required to display an image according to a setting of a user.

19. The method of claim 11, wherein the first control voltage is a pulse width modulation (PWM) dimming voltage.

20. The method of claim 11, wherein the generating comprises:
generating the first control voltage in the step-wise manner, by increasing at a first stage, the first control voltage to the reference voltage, maintaining at a second stage, the first control voltage at the reference voltage, and increasing at a third stage, the first control voltage to the set voltage, if the set voltage is larger than the reference voltage, and generating the second control voltage directly to the level of the set voltage, if the set voltage is smaller than the reference voltage.

21. A display to display an image, comprising:
a backlight;
a backlight driving unit which drives the backlight; and
a control unit which controls the backlight driving unit to initially drive the backlight according to a first initial driving manner, if the display is determined to be in a first state, and to initially drive the backlight according to a second initial driving manner, if the display is determined to be in a second state;
wherein if the display is in a first state, the control unit changes a brightness level of the backlight in a step-wise manner that comprises a plurality of stepped voltage levels that vary with time.

22. The display of claim 21, wherein a brightness level set by a user is lower than a reference brightness in the first state, and the backlight driving unit is controlled to change a brightness level of the backlight, in a step-wise manner in the first initial driving manner, and
the brightness level set by the user is higher than the reference brightness in the second state, and the backlight driving unit is controlled to change the brightness level of the backlight.

* * * * *